US012005411B2

(12) United States Patent
Gross et al.

(10) Patent No.: US 12,005,411 B2
(45) Date of Patent: Jun. 11, 2024

(54) SERVO-ROBOTIC ASYMMETRIC ROTATIONAL MIXER AND SYSTEM

(71) Applicant: FLACKTEK, INC., Landrum, SC (US)

(72) Inventors: Matthew L. Gross, Boulder, CO (US); Elliot Skultin, Littleton, CO (US); David Gallagher, Parker, CO (US)

(73) Assignee: FLACKTEK SPEEDMIXER, INC., Landrum, SC (US)

( * ) Notice: Subject to any disclaimer, the term of this patent is extended or adjusted under 35 U.S.C. 154(b) by 717 days.

(21) Appl. No.: 17/027,346

(22) Filed: Sep. 21, 2020

(65) Prior Publication Data

US 2021/0086153 A1 Mar. 25, 2021

Related U.S. Application Data

(60) Provisional application No. 63/047,704, filed on Jul. 2, 2020, provisional application No. 62/902,864, filed on Sep. 19, 2019.

(51) Int. Cl.

| | |
|---|---|
| ***B01F 35/00*** | (2022.01) |
| ***B01F 35/21*** | (2022.01) |
| ***B01F 35/212*** | (2022.01) |
| ***B01F 35/22*** | (2022.01) |
| ***B01F 35/221*** | (2022.01) |
| ***B01F 35/32*** | (2022.01) |
| ***B01F 35/71*** | (2022.01) |

(52) U.S. Cl.

CPC ...... *B01F 35/2202* (2022.01); *B01F 35/2115* (2022.01); *B01F 35/212* (2022.01); *B01F 35/2207* (2022.01); *B01F 35/221422* (2022.01); *B01F 35/3204* (2022.01); *B01F 35/71705* (2022.01); *B01F 35/71735* (2022.01)

(58) Field of Classification Search

CPC ............ B01F 35/212; B01F 35/221422; B01F 35/71735; B01F 35/2115; B01F 35/71705; B01F 35/3204; B01F 35/2207

See application file for complete search history.

(56) References Cited

U.S. PATENT DOCUMENTS

| | | | | |
|---|---|---|---|---|
| 7,021,123 | B2 | 4/2006 | Wallevik et al. | |
| 9,579,255 | B2 | 2/2017 | Eliuk et al. | |
| 2003/0179646 | A1 | 9/2003 | Miller | |
| 2007/0203010 | A1* | 8/2007 | Kim ...................... | B04B 5/0421 494/20 |
| 2012/0135846 | A1* | 5/2012 | Yao ......................... | B01F 29/10 494/13 |

(Continued)

FOREIGN PATENT DOCUMENTS

| | | | |
|---|---|---|---|
| JP | 2001347152 | B2 | 12/2006 |
| WO | 03/084654 | A1 | 10/2003 |

(Continued)

OTHER PUBLICATIONS

International Search Report and Written Opinion for International Application No. PCT/US2020/051808; Feb. 1, 2021.

*Primary Examiner* — Anshu Bhatia
(74) *Attorney, Agent, or Firm* — Berg Hill Greenleaf Ruscitti LLP

(57) ABSTRACT

Devices, systems, and methods are provided for mixing by asymmetric rotation using a servo motor to drive the symmetric rotation. The system may include a robotic arm and robotic controller.

9 Claims, 8 Drawing Sheets

(56) References Cited

U.S. PATENT DOCUMENTS

| | | | |
|---|---|---|---|
| 2016/0136052 A1 | 5/2016 | Koike et al. | |
| 2018/0085721 A1 | 3/2018 | Rinaldis et al. | |
| 2018/0268641 A1 | 9/2018 | Bartholomew et al. | |
| 2021/0001292 A1* | 1/2021 | Takaoka | B01F 35/2115 |

FOREIGN PATENT DOCUMENTS

| | | |
|---|---|---|
| WO | 2008/043463 A1 | 4/2008 |
| WO | 2009/137480 A1 | 11/2009 |
| WO | 2016088136 A2 | 6/2016 |

* cited by examiner

SERVO-ROBOTIC ASYMMETRIC ROTATIONAL MIXER AND SYSTEM

PRIORITY

This application claims benefit of co-pending U.S. provisional patent application numbers U.S. 62/902,864, filed Sep. 19, 2019, entitled SERVO-ROBOTIC ASYMMETRIC ROTATIONAL MIXER, and U.S. 63/047,704, filed Jul. 2, 2020, entitled SERVO-ROBOTIC ASYMMETRIC ROTATIONAL MIXER AND SYSTEM, the disclosures of which are incorporated by reference in their entirety herein.

BACKGROUND

The present disclosure relates generally to devices, systems, and methods of mixing. More specifically, the present disclosure relates to devices, systems, and methods of mixing by asymmetric rotation.

Flowable materials, such as, but not limited, to creams or powders, are often a mixture of several components. It can be desirable to mechanically mix the components thoroughly and completely at high speed to provide homogeneity of the resultant mixture. The mixing process can be particularly important for materials which are challenging to handle such as fine materials and/or viscous materials. Asymmetric rotation of the components in a mechanical mixer can provide the appropriate mixing for the desired mixing results.

Yet, conventional asymmetric rotation mixers can present challenges to larger process operations. Although asymmetric rotation mixers can be employed at a modest scale, using manual or semi-manual interfacing, integration of conventional asymmetric rotation mixing into automated manufacturing processes can be challenging.

SUMMARY

The following presents a simplified summary in order to provide a basic understanding of some aspects of various invention embodiments. The summary is not an extensive overview of the disclosed invention. It is neither intended to identify key or critical elements of the invention nor to delineate the scope of the invention. The following summary merely presents some concepts of the invention in a simplified form as a prelude to the more detailed description below.

According to an aspect of the present disclosure, an asymmetrical rotation mixer for mixing materials may include a rotational mount for receiving a container housing one or more materials for rotational mixing, a servo motor for providing rotational drive to the rotational mount, the servo motor including a servo motor control system for maintaining angular position control of an output shaft engaged to drive rotation of the rotational mount, and a mixer control system including a user interface for receiving input of a mixing profile, wherein the mixer control system provides indication of the mixing profile to the servo motor for execution.

According to another aspect of this disclosure, a system for automated mixing of one or more containers may include a robotic arm for loading and removing from a mixer a container housing one or more materials to be mixed, a robotic controller coupled to and in communication with the robotic arm and the mixer to control movement of the robotic arm to load and remove the container from the mixer, and a mixer control system including a scanner for scanning mixing profile information from a label, wherein the mixer control system provides the scanned mixing profile to a servo motor of the mixer for execution.

BRIEF DESCRIPTION OF THE DRAWINGS

The drawings disclose exemplary embodiments in which like reference characters designate the same or similar parts throughout the figures of which.

DETAILED DESCRIPTION

Unless otherwise indicated, the drawings are intended to be read (for example, cross-hatching, arrangement of parts, proportion, degree, or the like) together with the specification, and are to be considered a portion of the entire written description of this invention. As used in the following description, the terms "horizontal", "vertical", "left", "right", "up" and "down", "upper" and "lower" as well as adjectival and adverbial derivatives thereof (for example, "horizontally", "upwardly", or the like), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Traditional asymmetric rotational mixers often apply an alternating current (AC) induction motor having basic speed controls to drive rotation of the materials to be mixed. However, such motors can lack precision and/or accuracy in rotational position and/or speed. Among the complications inhibiting more precise position and/or speed control in asymmetric rotational mixers, inertial mismatch (e.g., the mismatch of inertia between the load and the motor drive) can be particularly high, creating high barriers to achieving greater speed and/or positional controls. In particular, lack of positional accuracy, for example, to begin, pause, or end a mixing stage can limit and/or strain the use of automation in applying asymmetric rotational mixers.

Figure 1:
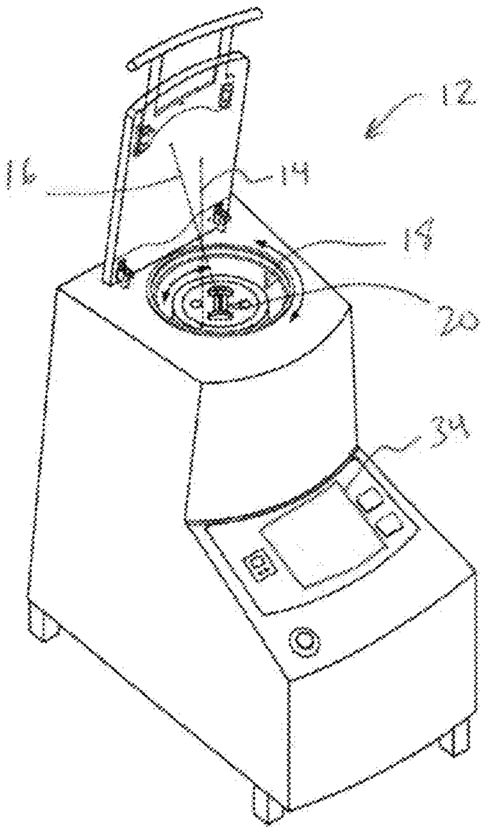
FIG. 1 is a perspective view of an asymmetric rotation mixer in accordance with illustrative embodiments disclosed herein, showing that the mixer includes a rotational mount which can rotate subject materials simultaneously about two distinct axes.

Referring to FIG. 1, an asymmetric rotational mixer 12 is shown having primary rotation axis 14 and secondary rotation axis 16 about which a load of materials can be rotated at high speeds for mixing. Specifically, the mixer 12 includes a rotational mount 18, which can receive a container 20 having the materials to be mixed. Although the rotational mount 18 and container 20 are each shown having particular shape and form, in some embodiments, any suitable mount and container for high speed asymmetric rotational mixing may be applied.

Figure 2:
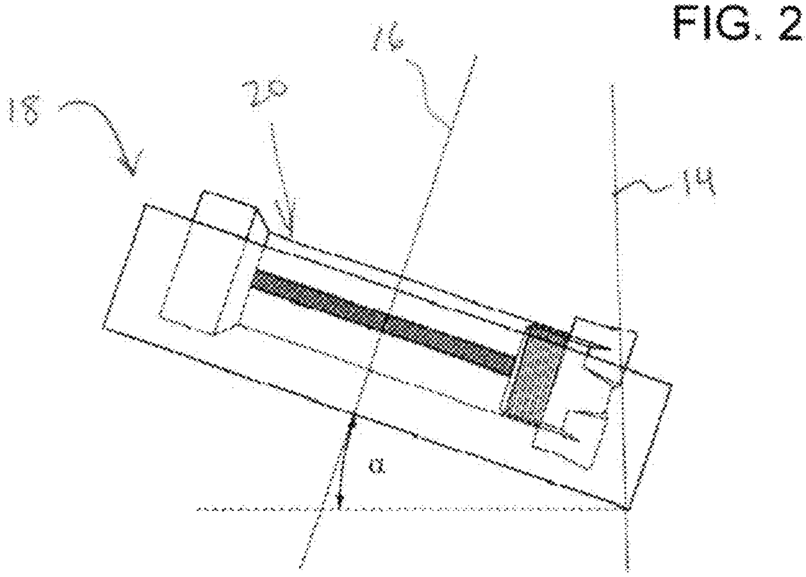
FIG. 2 is plan view of an exemplary rotational mount of the mixer of FIG. 1 showing an exemplary arrangement of the two axes including a first vertical axis and a second axis angled and offset laterally with respect to the first axis.

The rotational mount 18 can be connected to receive rotational drive about the axes 14, 16. Referring to FIG. 2, the primary axis 14 is illustratively arranged vertically and the secondary axis 16 is arranged at an angle a from horizontal, offset from the primary axis 14.

Figure 3:
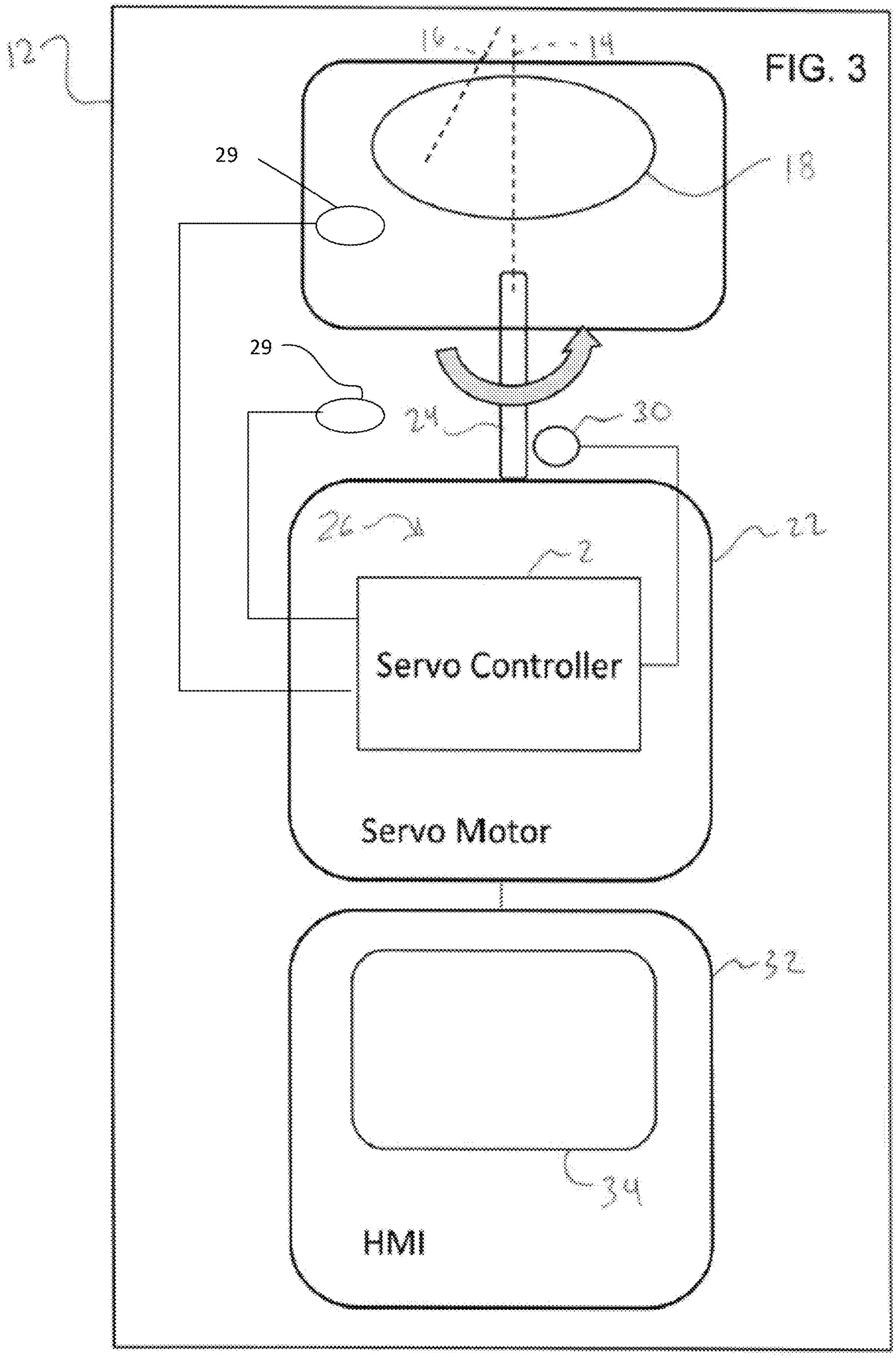
FIG. 3 is a diagrammatic view of the mixer of FIG. 1 showing the mixer includes a servo motor that is directly coupled with the rotational mount of the mixer, and a human-machine interface (HMI) for communication between the servo motor and the user, the HMI having a graphical display.

Referring now to FIG. 3, the mixer 12 illustratively includes a servo motor 22 coupled with the rotational mount 18 to provide drive for rotation. The servo motor 22 provides enhanced rotational position control over other motors, such as AC induction motors, providing more reliable, accurate, and/or precise ability to stop and/or start the rotation of the rotational mount 18, and ultimately the container 20. Such precision in, for example, positioning of the mount 18 and container 20 can be particularly desirable in highly automated operations. For example, by highly accurate and/or precise stopping of the container 20 in position, a robotic arm can more easily and/or quickly address the container to perform various tasks such as setting up the initial ingredient (s) of a mix sequence, adding ingredients at various mixing stages, and/or removing and/or placing the container 20.

The servo motor 22 includes an output shaft 24 that is directly coupled to drive the rotational mount 18 for rotation about the primary axis 14 with a 1:1 ratio. In the illustrative embodiment, the servo motor 22 is directly coupled to drive the rotational mount 18 by direct connection with the rotational mount 18, without any gear box or other mechanical velocity change element. In some embodiments, the servo motor 22 may be directly coupled with the rotational mount 18 via mechanical interface to change the direction and/or orientation of rotation without change in the speed of rotation. The direct coupling of the output shaft 24 with the rotational mount 18 about the primary axis 14 can enhance the speed and/or position control of the servo motor 22 over the rotational mount 18 and the container 20.

The servo motor 22 includes a servo control system 26 comprising a servo controller 28 and a sensor 30. The servo controller 28 comprises a processor, memory storage, and communication circuitry, wherein the processor executes instructions stored on the memory storage, and issues/receives command signals via the communication circuitry based on the executed instructions.

The sensor 30 is illustratively embodied as a position sensor sensing the angular position of the shaft 24 for feedback control to the servo controller 28. The servo controller 28 is embodied to apply proportional-integral-derivative (PID) control to the angular position of the shaft 24 to provide high accuracy and/or positioning based on the information from the sensor 30. By providing responsive control to the shaft 24 angular position, mismatch in the inertial mismatch can be accommodated, overcoming the barriers of more precise angular control, for example, in AC induction motors.

For example, in asymmetrical rotational mixers, the inertial mismatch can be upwards of 60:1, or even up to 100:1, providing very high inertial mismatches even for common servo motors to accommodate. Yet, particular application of servo motors to asymmetrical rotational mixers can overcome barriers to interfacing with automated robotics as previously mentioned. Indeed, in some embodiments, the servo motor 22 can be arranged to accommodate such inertial mismatch in real-time, overcoming the particular variations in inertial mismatch that can occur in mixing, for example, by variation in mixing profile, and/or movement and/or change in composition of the mixed materials during mixing. Accordingly, asymmetrical rotational mixers can be enhanced in positional acuity for use in automated process, whether fully or partly.

Referring still to FIG. 3, the mixer 12 illustratively includes a human-machine interface (HMI) 32 embodied to include a graphical display as a graphical user interface (GUI) 34. The HMI 32 is embodied as itself a higher level control system comprising processor, memory storage, and communications circuitry, wherein the processor executes instructions stored on the memory storage to communicate signals via the communications circuitry. The HMI 32 provides the operational mixing control as a governing control of rotational operations of the servo motor, while the servo control system 26 provides underlying angular position control. In some embodiments, the HMI 32 may provide safety and/or operation controls, such as lockouts, warnings, and/or operational shutdowns, for example, on threshold such as vibration thresholds.

According to FIG. 3, the mixer 12 may further include one or more sensors 29 to sense the status of the materials being mixed. For example, the sensor 29 may be a torque or vibration sensor that provides feedback regarding changes in torque or vibration experienced by the mixer and associates the changes with a status of the materials such as phase, full dispersion, homogeneity, or separation of the materials in the container. Alternatively or additionally, the one or more sensors 29 may include infrared or thermocouple sensors for determining temperature of the mixture and associating the temperature with a status of the mixture materials. Alternatively or additionally, the one or more sensors 29 may include optical sensors such as cameras for determining optical properties in the mixing materials and associating the optical properties with the status of the mixing materials. In this manner the one or more sensors 29 may be used to determine whether mixing is complete. The one or more sensors 29 may be coupled to the servo motor 22 to provide feedback to the servo motor system 26 regarding whether the mixing is complete and thereby, may stop the servo motor 22. In some embodiments a plurality of sensors 29 may provide feedback, each communicating the same status, before the status, e.g., "mixing is complete," is verified.

Figure 4:
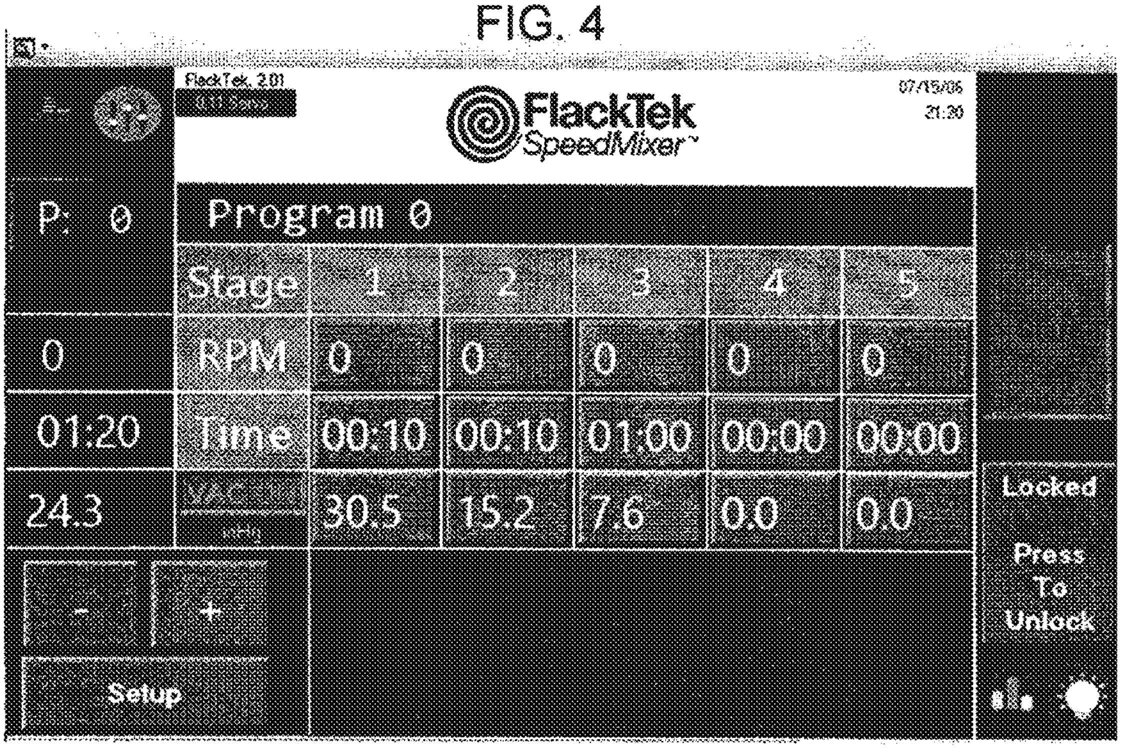
FIG. 4 is a depiction of a screen of the graphical display of the HMI indicating selected parameters of a mixing profile.

Referring now to FIG. 4, an exemplary screen of the GUI 34 includes an input interface for the user to set a mixing profile. The mixing profile can include one or more stages, each stage having parameters such as target rotational speed (e.g., RPM), duration, and vacuum pressure. Completion of one stage proceeds to the following stage. The user can enter the parameters for each stage for execution.

Figure 5:
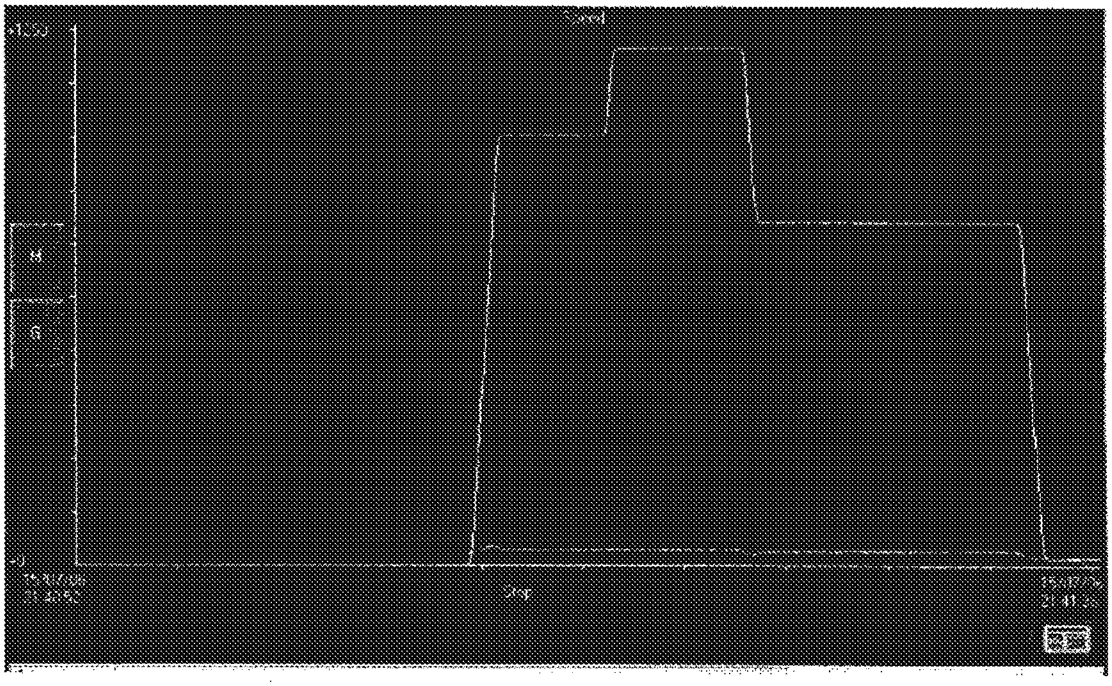
FIG. 5 is a depiction of a screen of the graphical display of the HMI indicating a graph of the selected mixing profile.

Once the user activates the start button, the HMI 32 sends a command signal to the servo motor providing instruction indicating the mixing profile for execution. The servo motor 22 executes the mixing profile, while performing angular position control as an underlying process control. Referring to FIG. 5, the user can select a graphical view on the GUI 34 of the presently selected speed profile.

Figure 6:
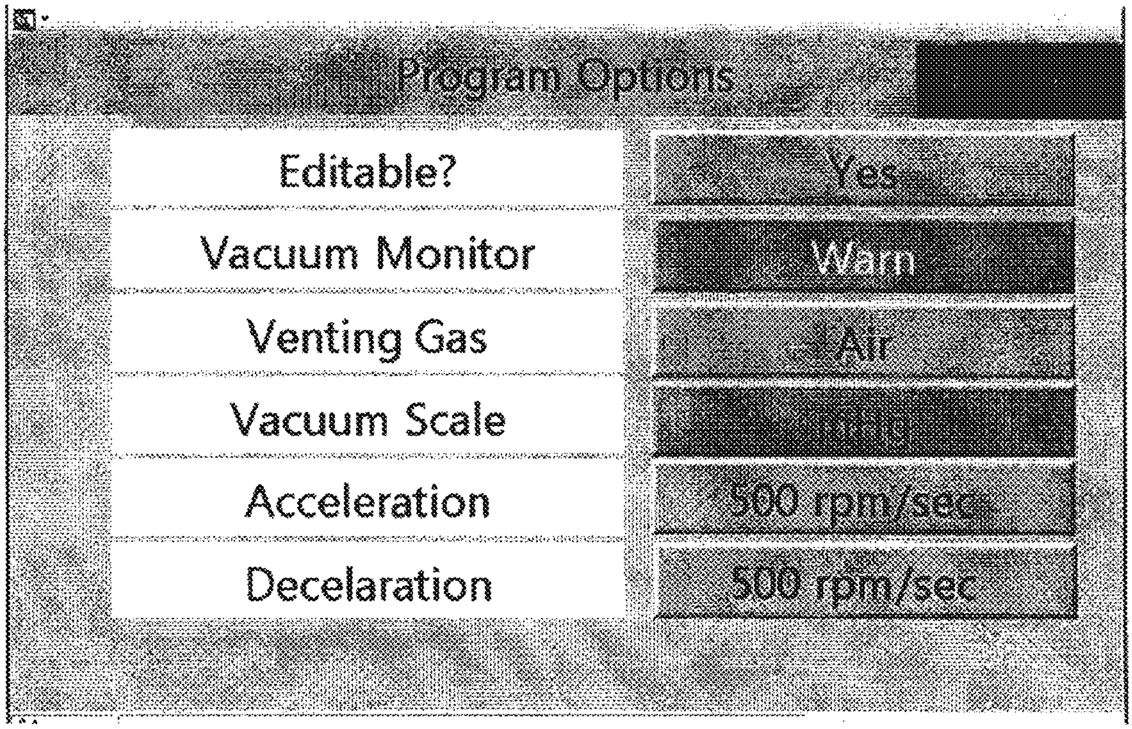
FIG. 6 is a depiction of a screen of the graphical display of the HMI indicating an options menu.

Referring to FIG. 6, the user can select a settings menu to adjust input interface settings. For example, the user can determine whether the profile is editable, whether violation of the set vacuum pressures causes warning or stoppage of mixing, the type of vent gas to be used, the scale of vacuum pressure. The user can customize the rate of acceleration and/or deceleration as desired. Additionally, one or more sensors 29 may be coupled to the HMI 32 so that the sensed mixing completeness is displayable in the HMI 32 and the user can customize or update the mixing, including starting, stopping, increasing or decreasing acceleration, as part of a feedback loop based on the information from the one or more sensors 29.

In the illustrative embodiment, the servo motor 22 is illustratively coupled to drive rotation of the rotational mount about the primary axis 14, and rotation about the secondary axis 16 is accomplished by secondary take off (e.g., by geared ratio) from the power provided for rotation about the primary axis 14. In the illustrative embodiment, the HMI commands may include PLC by Modbus protocol, although in some embodiments, any suitable arrangement of instructions may apply.

The user-settable mixing parameters and/or profile allow decoupling of the servo motor controls by hierarchal control structure. This tiered system of controls allows the servo control system 26 to be particularly tuned for asymmetrical rotational mixing, allowing the efficient management of the inertial mismatch often experienced. Accordingly, enhanced rotational position control and/or rotational speed control can be provided in the context of asymmetrical rotational mixers using a servo motor control. Moreover, such asymmetrical rotational mixers can be more easily, cost effectively, and safely incorporated into robotic processes such as automated processes.

Figure 7:
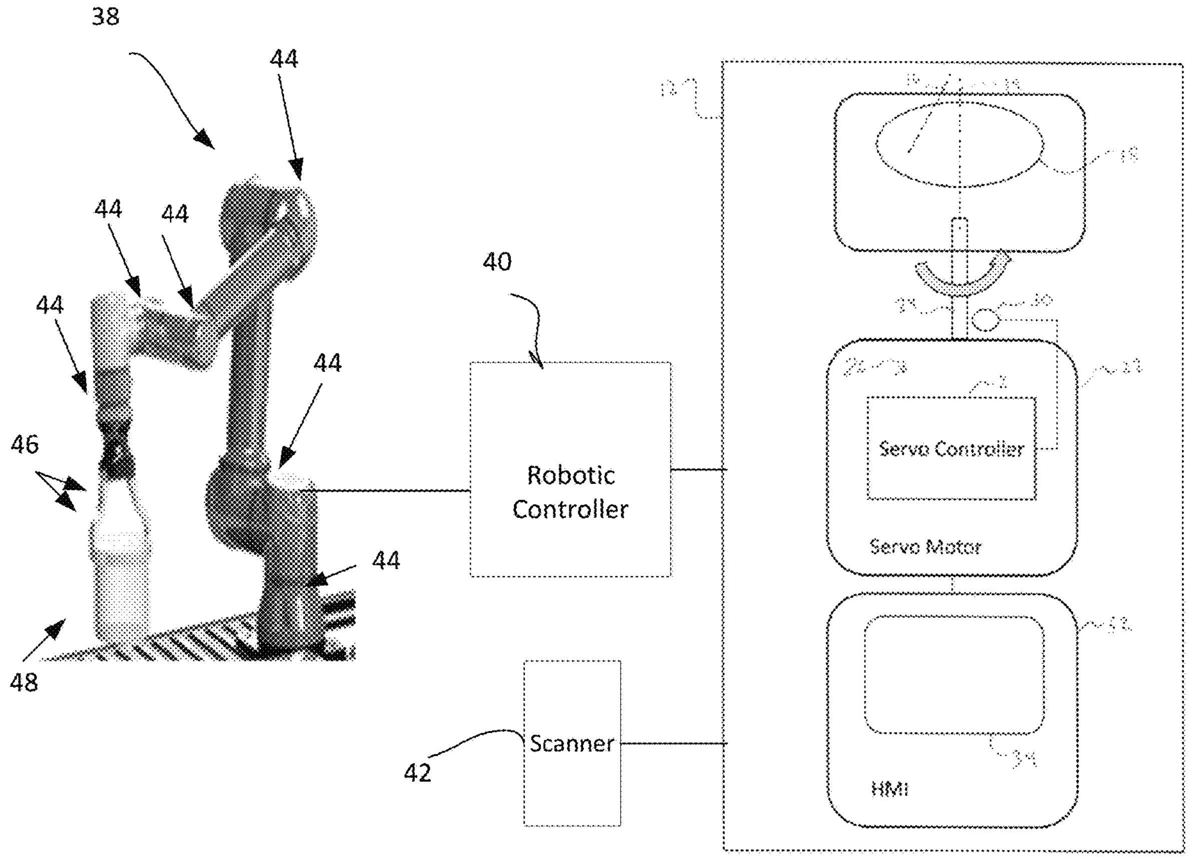
FIG. 7 is a diagrammatic view of a mixing system incorporating an asymmetric rotation mixer a robotic arm for loading the mixer, unloading the mixer, and a robotic controller for automatically controlling the robotic arm.

According to another embodiment in FIG. 7, an automated system is shown having a robotic arm 38, a robotic controller 40 and the mixer 12. The robotic arm may be controlled by the robotic controller, which may comprise a processor, memory storage, and communication circuitry, wherein the processor executes instructions stored on the memory storage, and issues/receives command signals via the communication circuitry based on the executed instructions for automated operation of the robotic arm 38. The robotic arm 38 may be of a compact design including several articulating joints 44 providing range of motion within a relatively small area, and a pair of grabbing jaws 46. The grabbing jaws 46 move radially inward and outward and may be shaped to conform to the exterior of cylindrical, or other shaped, sidewall 49 or lid 51 of the container 48.

Figure 8:
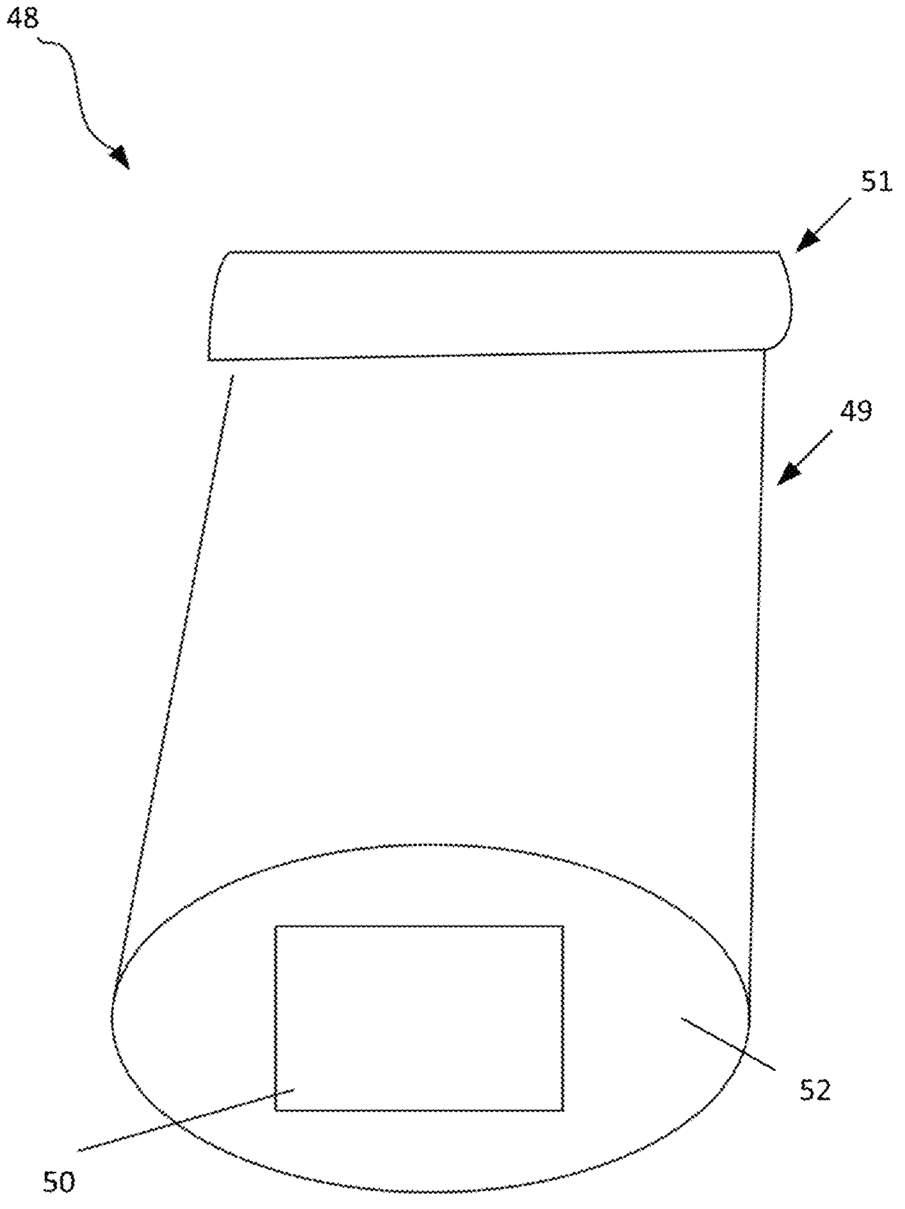
FIG. 8 is a diagrammatic view of a mixing container with an 2-dimensional (2-D) barcode on the bottom of the mixing container.

The robotic controller 40 may be coupled to the robotic arm 38 and the mixer 12 via communication circuitry. The robotic controller 40 may direct the robotic arm 38 to perform one or more functions including, picking up the container 48, holding the container over the scanner 42, placing the container 48 in the mixer 12, and removing the container from the mixer 12. The mixer 12 may be coupled to scanner 42, or barcode scanner. The scanner 42 may scan a label with 2-D barcode 50 affixed on a bottom surface 52 or other surface of the container 48 as shown in FIG. 8. The 2-D barcode 50 may include information regarding the mixing profile for the formulation as well as identifying information of the particular container such as a serialized number in a batch. Other computer-readable labels may also be used with a corresponding scanner. The scanner may be communicatively integrated with the mixer control system so that this scanned information is provided to the servo controller 2 of the mixer 12 via the HMI 32 and may be displayed in the HMI 32 as described above with respect to FIG. 1. The mixer 12 may save the mixing profile and container identifier as part of a historical serialized batch record in a local memory or other storage within the HMI 32. The HMI 32 may also communicate with the robotic controller 40 via communications circuitry. Examples of communications may include signaling the robotic controller that the lid 51 has opened on the mixer 12 for container retrieval, or that an error occurred in mixing the contents of a container. Although this automated system is illustrated with the asynchronous rotational mixer of FIG. 1, it may be coupled to and used with other mixers.

Figure 9:
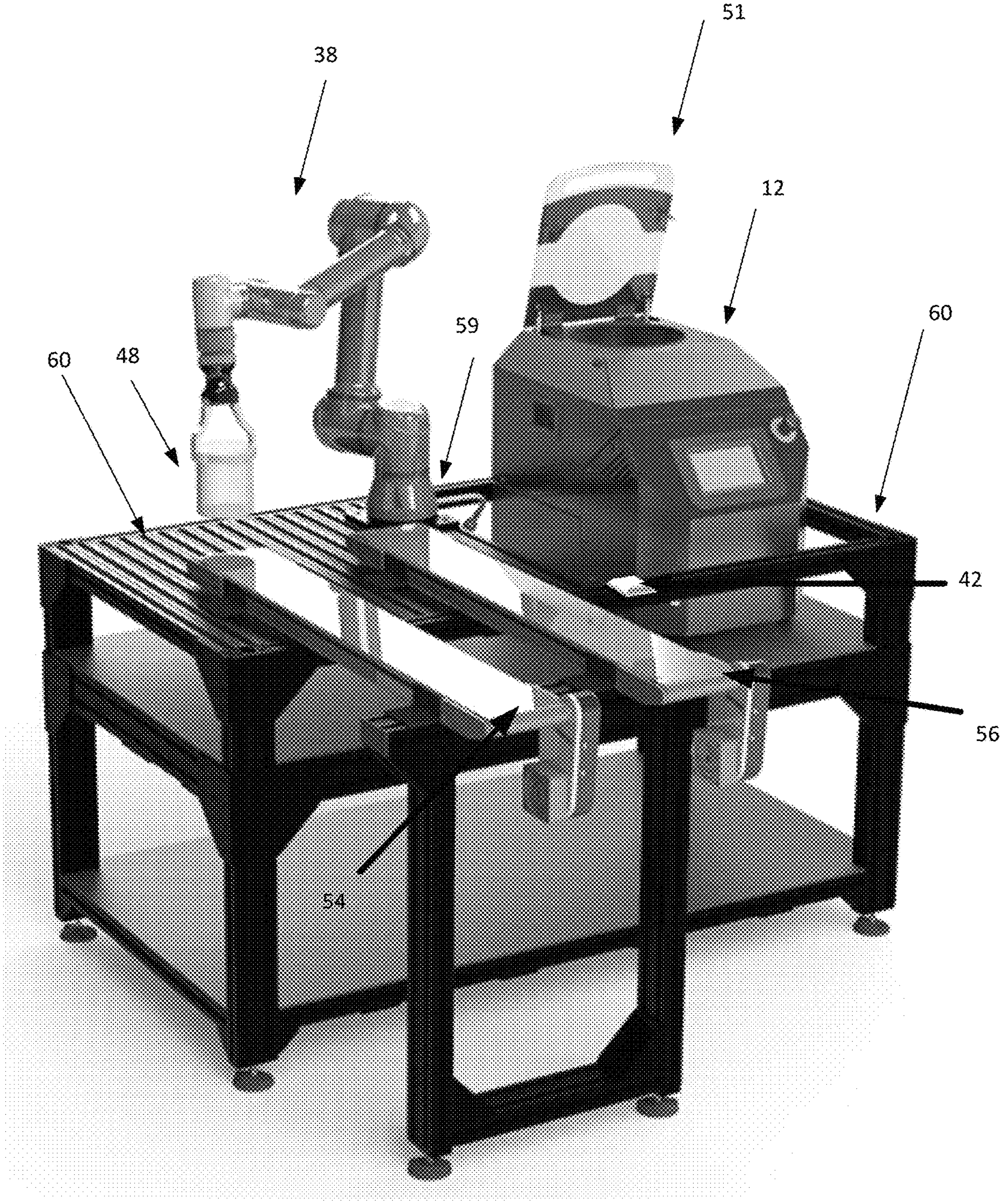
FIG. 9 is an illustration the system of FIG. 7 in an environment that automatically loads, mixes, unloads and documents the mixing for one or more containers.

As illustrated in FIG. 9, the automated system of FIG. 8 may be formed as a compact and cageless automated handling system to process multiple containers. In the illustrative embodiment, the automated handling system uses an inbound conveyer 54 and an outbound conveyer 56. Each of the robotic arm 38, the inbound and outbound conveyers 54, 56, the mixer 12 and the scanner 42 may be located in known positions relative to each other on a work bench 60 or other desk or surface, permitting people to work alongside the system and in the same space as the automated system due to its compact and cageless operation. The relative positions of the robotic arm 38, conveyers 54, 56, mixer 12, and scanner 42 in FIG. 9 are exemplary; however other relative positioning of each the components can be assigned to be the known positions. The conveyers 54, 56 may be conveyer belts that advance a predetermined length towards and away from a base 59 of the arm mounted via a base to the workbench 60. In this embodiment, the workbench 60 has grooves formed in a top surface to slide and adjust the relative positioning of the conveyers 54, 56 and the robotic arm 38. Although only one container 48 is depicted, multiple containers may be positioned on the inbound conveyer 54 to be mixed and/or on the outbound conveyer 56 after mixing.

Figure 10:
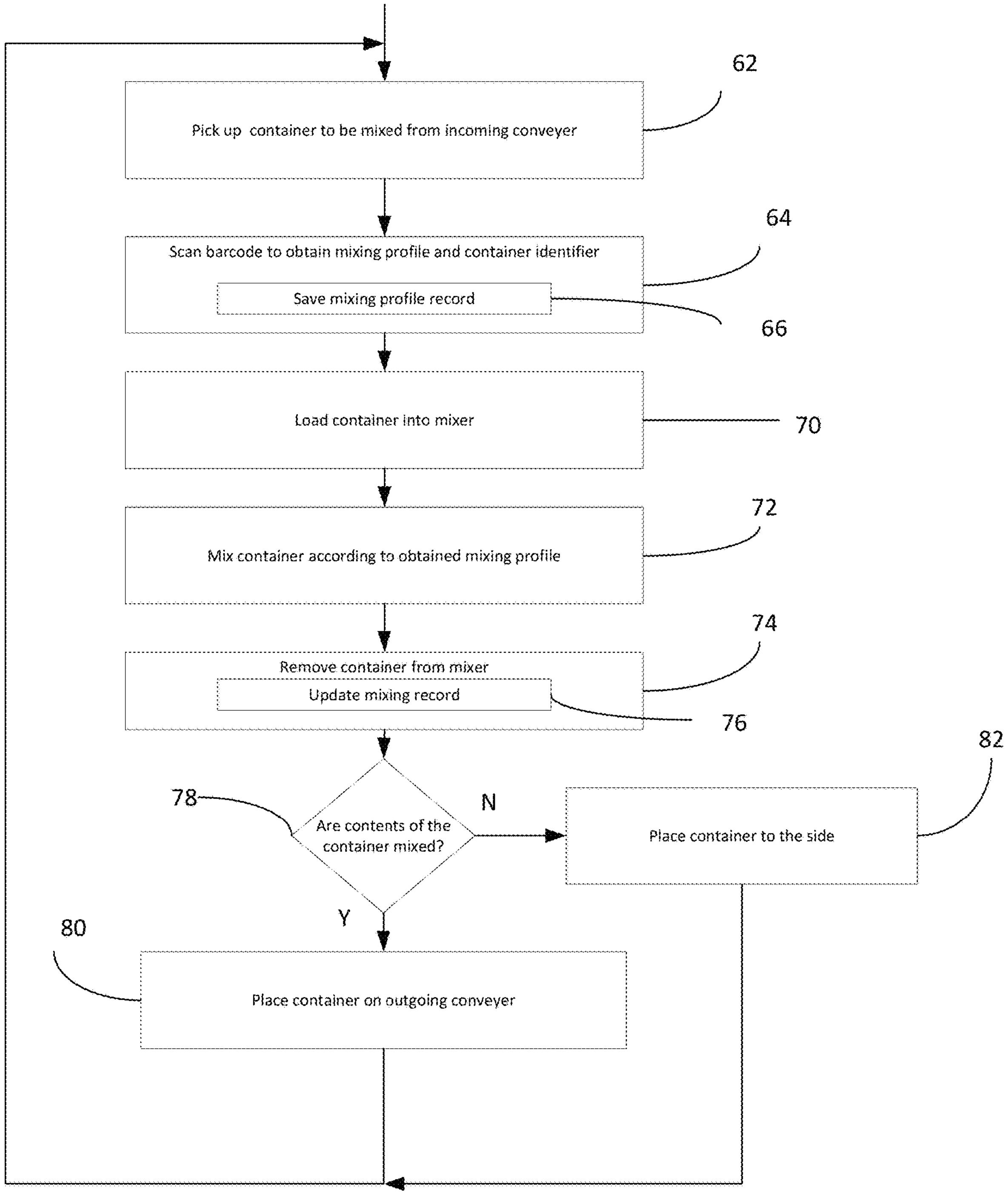
FIG. 10 is a flowchart of an automated operation of the mixing system.

In a method of automated operation according to FIG. 10, the robotic arm may pick up a container from a location, for example the inbound conveyer 62. The inbound conveyer may be configured to advance once a container is removed so that the next container is positioned where the removed container previously was on the inbound conveyer. The robotic arm moves the container over a location where a scanner is positioned and the scanner may scan the barcode to obtain the mixing profile for the contents of the container and a container identifier 64. Subsequently, the scanned information may be saved as a mixing record 66. The robotic arm may load the container into the mixer 70. After the container is loaded, the mixer lid automatically closes, and the mixer mixes the contents of the container according to the scanned mixing profile 72. The mixing profile may include parameters such as speeds, vacuum pressure, and time duration of mixing as well as the date. Mixing may be determined to be complete based on one or more sensors 29 as described above. After the mixing is complete, the mixer automatically opens its lid and the robotic arm removes the container from the mixer 74. The mixer may update the saved mixing record 76 to include whether the contents are mixed 78. These updates may include, for example, an electronic marker or error indicator in the record of the container indicating the mix was incomplete or could not be completed and signal a controller of the robotic arm if there was an error. If the contents are mixed, the robotic arm may place the mixed container on the outbound conveyer 80. The conveyer may advance so that subsequently mixed containers can be placed on the same location on the outbound conveyer by the robotic arm. If an error is communicated and the contents are not mixed, the container may be set aside 82 at a predefined location. Subsequently, the robotic arm may pick up a next container from the inbound conveyer and repeat the process. The process may be repeated without human intervention or assistance until no containers remain on the inbound conveyer.

Examples of suitable processors may include one or more microprocessors, integrated circuits, system-on-a-chips (SoC), among others. Examples of suitable memory storage, may include one or more primary storage and/or non-primary storage (e.g., secondary, tertiary, etc., storage); permanent, semi-permanent, and/or temporary storage; and/or memory storage devices including but not limited to hard drives (e.g., magnetic, solid state), optical discs (e.g., CD-ROM, DVD-ROM), RAM (e.g., DRAM, SRAM, DRDRAM), ROM (e.g., PROM, EPROM, EEPROM, Flash EEPROM), volatile, and/or non-volatile memory; among others.

Although the illustrative embodiments disclose the servo motor directly coupling to the rotational mount of the mixer, it is contemplated that the same servo motor can be indirectly coupled via a physical gear reduction system and belt drive to the rotational mount of the mixer. Such an indirect coupling would accommodate larger inertial mismatch experienced when mixing larger mixing masses, for example five-gallon containers.

Although only a number of exemplary embodiments have been described in detail above, those skilled in the art will readily appreciate that many modifications are possible in the exemplary embodiments without materially departing from the novel teachings and advantages. Accordingly, all such modifications are intended to be included within the scope of this disclosure as defined in the following claims. While the methods, equipment and systems have been described in connection with specific embodiments, it is not intended that the scope be limited to the particular embodiments set forth, as the embodiments herein are intended in all respects to be exemplary rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect.

Disclosed are components that can be used to perform the disclosed methods, equipment and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods, equipment and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods. Any patents, applications and publications referred to herein are incorporated by reference in their entirety.

What is claimed is:

1. An asymmetrical rotation mixer for mixing materials, the asymmetrical rotation mixer comprising:

(a) a rotational mount for receiving a container housing one or more materials for rotational mixing, the rotational mount having a primary vertical rotational axis and a secondary rotational axis wherein the secondary rotational axis is arranged at an angle a from horizontal and offset from the primary vertical axis;

(b) a servo motor for providing rotational drive to the rotational mount, the servo motor including a servo motor control system for maintaining angular position control of an output shaft engaged to drive rotation of the rotational mount and maintaining positional control of the rotational mount through the action of the servo motor; and (c) a mixer control system including a user interface for receiving input of a mixing profile, wherein the mixer control system provides indication of the mixing profile to the servo motor for execution.

2. The asymmetrical rotation mixer of claim 1, further comprising a sensor for sensing the angular position of the output shaft for feedback control by the servo motor control system.

3. The asymmetrical rotation mixer of claim 2, wherein the server controller system includes a servo controller configured to apply proportional-integral-derivative (PID) control to the angular position of the output shaft based on the information from the sensor.

4. The asymmetrical rotation mixer of claim 1, wherein the output shaft is directly coupled to the rotational mount to drive the rotational mount for rotation about the primary axis with a 1:1 ratio.

5. The asymmetrical rotation mixer of claim 1, wherein the servo motor control system executes the mixing profile, and wherein the servo controller system applies a proportional- integral-derivative control to the angular position of the output shaft to accommodate inertial mismatch between the one or more materials and the servo motor.

6. The asymmetrical rotation mixer of claim 1, further comprising one or more sensors to sense the state of the one or more materials, the one or more sensors comprising at least one of a torque sensor, a temperature sensor, and an optical sensor.

7. The asymmetrical rotation mixer of claim 6, wherein the one or more sensors includes two different sensors, and wherein in response to signals sensed by the two different sensors, the state of one or more materials is determined to be completely mixed.

8. The asymmetrical rotation mixer of claim 6, wherein in response to a sensed state of the one or more materials indicating the materials are completely mixed, the servo motor system stops rotation of the servo motor.

9. The asymmetrical rotation mixer of claim 1, wherein the received input of the mixing profile is changed via the user interface.

* * * * *